United States Patent
Berman et al.

(10) Patent No.: US 12,223,748 B2
(45) Date of Patent: Feb. 11, 2025

(54) SYSTEMS AND METHODS FOR IDENTIFYING CHANGES IN A SPACE

(71) Applicant: INTERAPTIX INC., Toronto (CA)

(72) Inventors: Isaac Louis Gold Berman, Toronto (CA); Bardia Bina, Toronto (CA)

(73) Assignee: INTERAPTIX INC., Toronto (CA)

( * ) Notice: Subject to any disclaimer, the term of this patent is extended or adjusted under 35 U.S.C. 154(b) by 167 days.

(21) Appl. No.: 18/123,006

(22) Filed: Mar. 17, 2023

(65) Prior Publication Data
US 2023/0298364 A1    Sep. 21, 2023

Related U.S. Application Data

(60) Provisional application No. 63/321,288, filed on Mar. 18, 2022.

(51) Int. Cl.
| | |
|---|---|
| G06V 20/64 | (2022.01) |
| G06T 3/18 | (2024.01) |
| G06T 7/13 | (2017.01) |
| G06T 7/30 | (2017.01) |
| G06T 7/50 | (2017.01) |
| G06T 7/70 | (2017.01) |
| G06T 19/00 | (2011.01) |
| G06V 10/74 | (2022.01) |
| G06V 10/764 | (2022.01) |
| G06V 20/50 | (2022.01) |

(52) U.S. Cl.
CPC ............ *G06V 20/64* (2022.01); *G06T 3/18* (2024.01); *G06T 7/13* (2017.01); *G06T 7/30* (2017.01); *G06T 7/50* (2017.01); *G06T 7/70* (2017.01); *G06T 19/003* (2013.01); *G06T 19/006* (2013.01); *G06V 10/761* (2022.01); *G06V 10/764* (2022.01); *G06V 20/50* (2022.01); *G06T 2200/04* (2013.01); *G06T 2200/24* (2013.01); *G06T 2207/10048* (2013.01); *G06T 2210/04* (2013.01)

(58) Field of Classification Search
CPC .... G06V 20/64; G06V 10/761; G06V 10/764; G06V 20/50; G06V 20/647; G06V 10/62; G06T 3/18; G06T 7/13; G06T 7/30; G06T 7/50; G06T 7/70; G06T 19/003; G06T 19/006; G06T 2200/04; G06T 2200/24; G06T 2207/10048; G06T 2210/04; G06T 19/00; G06T 2207/10028; G06T 2210/61; G06T 7/254
See application file for complete search history.

(56) References Cited

U.S. PATENT DOCUMENTS

| | | | |
|---|---|---|---|
| 2017/0177933 A1* | 6/2017 | Mittal | G06F 18/22 |
| 2019/0188853 A1* | 6/2019 | Schirman | G06T 7/136 |
| 2020/0313964 A1* | 10/2020 | Ito | G06T 7/20 |
| 2023/0066290 A1* | 3/2023 | Nussbaum | G06T 19/20 |
| 2023/0290078 A1* | 9/2023 | Peebler | G06T 19/00 |

* cited by examiner

*Primary Examiner* — Maurice L. McDowell, Jr.
(74) *Attorney, Agent, or Firm* — Perry + Currier Inc.

(57) ABSTRACT

An example method includes: retrieving a previous representation representing a target portion of a space; obtaining a current representation representing the target portion of the space; comparing the previous representation to the current representation to identify a change in the target portion of the space; mapping the target portion of the space to a three-dimensional (3D) representation of the space to locate the change within the 3D representation; and storing a change map defining the change in context of the 3D representation.

21 Claims, 10 Drawing Sheets

SYSTEMS AND METHODS FOR IDENTIFYING CHANGES IN A SPACE

FIELD

The specification relates generally to systems and methods for virtual representations of spaces, and more particularly to a system and method for identifying changes in a space based on representations of the space.

BACKGROUND

Virtual representations of spaces, such as 3D models, can be useful to allow remote users to view a space. When new representations are updated, it may be difficult and time-consuming for users to compare the two representations to identify changes made in the space.

SUMMARY

According to an aspect of the present specification an example method includes: retrieving a previous representation representing a target portion of a space; obtaining a current representation representing the target portion of the space; comparing the previous representation to the current representation to identify a change in the target portion of the space; mapping the target portion of the space to a three-dimensional (3D) representation of the space to locate the change within the 3D representation; and storing a change map defining the change in context of the 3D representation.

According to another aspect of the present specification, an example server includes: a memory and a communications interface; and a processor interconnected with the memory and the communications interface, the processor configured to: retrieve, from the memory, a previous representation representing a target portion of a space; receive, via the communications interface, a current representation representing the target portion of the space; compare the previous representation to the current representation to identify a change in the target portion of the space; map the target portion of the space to a three-dimensional (3D) representation of the space to locate the change within the 3D representation; and store a change map defining the change in context of the 3D representation.

According to another aspect of the present specification, an example system includes: a database storing previously captured representations of a space and a persistent 3D representation of the space; a data capture device configured to capture a current representation of the space; and a server configured to: retrieve, from the database, one of the previously captured representations; receive, from the data capture device, the current representation of the space; compare the previously captured representation and the current representation to identify a change in the space; locate the change within the persistent 3D representation; and generate a change map defining the change in context of the persistent 3D representation

BRIEF DESCRIPTION OF DRAWINGS

Implementations are described with reference to the following figures, in which.

DETAILED DESCRIPTION

Figure 1:
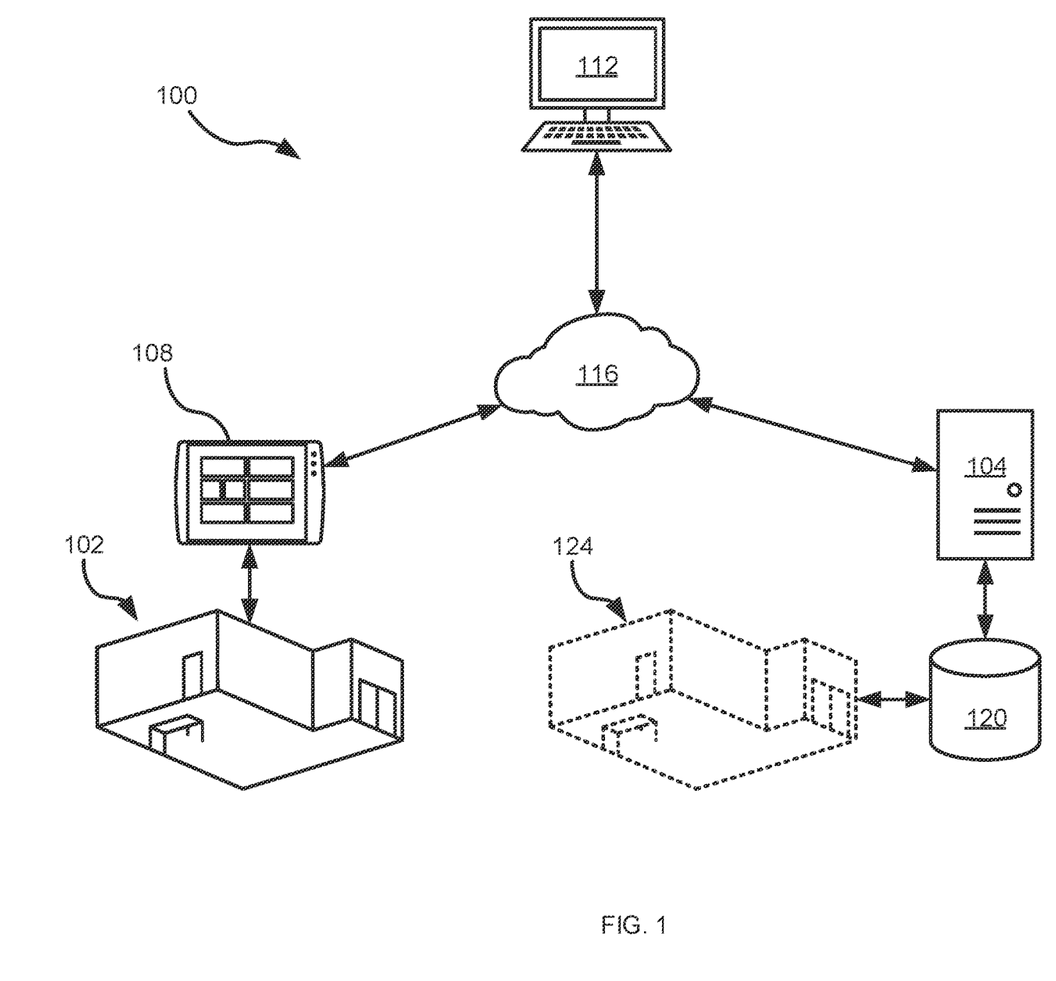
FIG. 1 depicts a block diagram of an example system for identifying changes in a space.

FIG. 1 depicts a block diagram of an example system 100 for identifying changes in a space 102 based on representations of space 102. For example, space 102 can be a factory or other industrial facility, an office a new building, a private residence, or the like. In other examples, the space 102 can be a scene including any real-world location or object, such as a construction site, a vehicle such as a car or truck, equipment, or the like. It will be understood that space 102 as used herein may refer to any such scene, object, target, or the like. System 100 includes a server 104 and a client device 112 which are preferably in communication via a network 116. System 100 can additionally include a data capture device 108 which can also be in communication with at least server 104 via network 116.

Server 104 is generally configured to identify changes within a representation of space 102. Server 104 can be any suitable server or computing environment, including a cloud-based server, a series of cooperating servers, and the like. For example, server 104 can be a personal computer running a Linux operating system, an instance of a Microsoft Azure virtual machine, etc. In particular, server 104 includes a processor and a memory storing machine-readable instructions which, when executed, cause server 104 to identify changes within a representation of space 102, as described herein. Server 104 can also include a suitable communications interface (e.g., including transmitters, receivers, network interface devices and the like) to communicate with other computing devices, such as client device 112 via network 116.

Data capture device 108 is a device capable of capturing relevant data such as image data, depth data, audio data, other sensor data, combinations of the above and the like. Data capture device 108 can therefore include components capable of capturing said data, such as one or more imaging devices (e.g., optical cameras), distancing devices (e.g., LIDAR devices or multiple cameras which cooperate to allow for stereoscopic imaging), microphones, and the like. For example, data capture device 108 can be an IPad Pro, manufactured by Apple, which includes a LIDAR system and cameras, a head-mounted augmented reality system, such as a Microsoft Hololens™, a camera-equipped handheld device such as a smartphone or tablet, a computing device with interconnected imaging and distancing devices (e.g., an optical camera and a LIDAR device), or the like. Data capture device 108 can implement simultaneous localization and mapping (SLAM), 3D reconstruction methods, photogrammetry, and the like. The actual configuration of data capture device 108 is not particularly limited, and a variety of other possible configurations will be apparent to those of skill in the art in view of the discussion below.

Data capture device 108 additionally includes a processor, a non-transitory machine-readable storage medium, such as a memory, storing machine-readable instructions which, when executed by the processor, can cause data capture device 108 to perform data capture operations. Data capture device 108 can also include a display, such as an LCD (liquid crystal display), an LED (light-emitting diode) display, a heads-up display, or the like to present a usual with visual indicators to facilitate the data capture operation. Data capture device 108 also includes a suitable communications interface to communicate with other computing devices, such as server 104 via network 116.

Client device 112 is generally configured to present a representation of space 102 to a user and allow the user to interact with the representation, including providing inputs and the like, as described herein. Client device 112 can be a computing device, such as a laptop computer, a desktop computer, a tablet, a mobile phone, a kiosk, or the like. Client device 112 includes a processor and a memory, as well as a suitable communications interface to communicate with other computing devices, such as server 104 via network 116. Client device 112 further includes one or more output devices, such as a display, a speaker, and the like, to provide output to the user, as well as one or more input devices, such as a keyboard, a mouse, a touch-sensitive display, and the like, to allow input from the user.

Network 116 can be any suitable network including wired or wireless networks, including wide-area networks, such as the Internet, mobile networks, local area networks, employing routers, switches, wireless access points, combinations of the above, and the like.

System 100 further includes a database 120 associated with server 104. For example, database can be one or more instances of My SQL or any other suitable database. Database 120 is configured to store data to be used to identify changes in space 102. In particular, database 120 is configured to store a persistent representation 124 of space 102. In particular, representation 124 may be a 3D representation which tracks persistent spatial information over time. Other representations, including 2D representations (e.g., optical images, thermal images, etc.) and 3D representations (e.g., 3D scans, including partial scans, depth maps, etc.) may also be stored at database 120. Database 120 can be integrated with server 104 (i.e., stored at server 104), or database 120 can be stored separately from server 104 and accessed by the server 104 via network 116.

Figure 2:
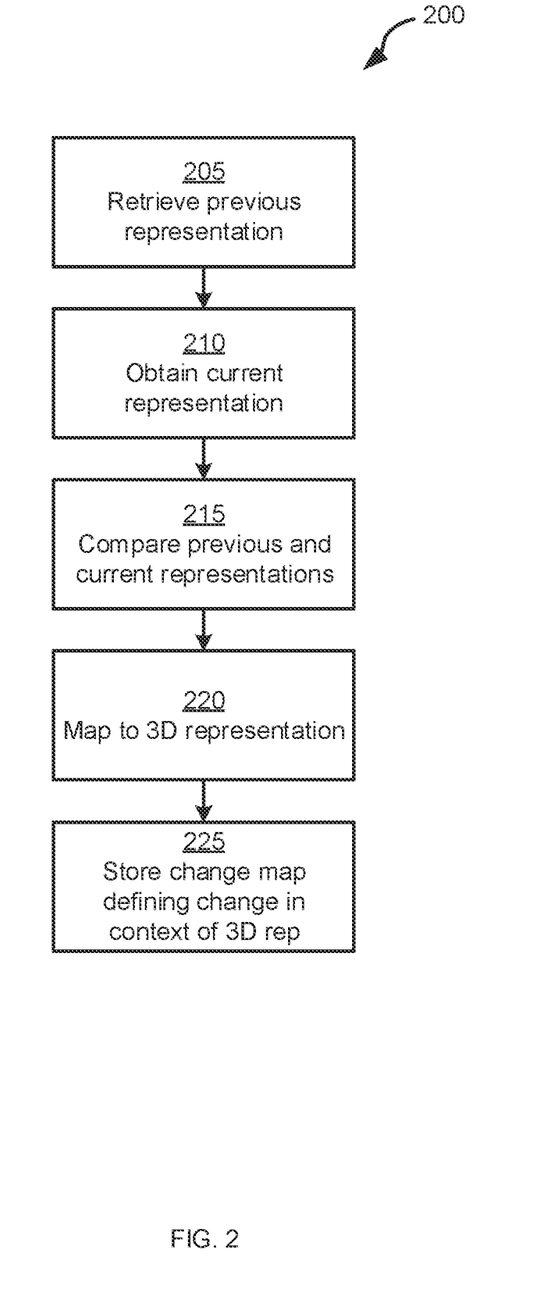
FIG. 2 depicts a flowchart of an example method of identifying changes in a space based on representations of the space.

Referring to FIG. 2, an example method 200 of identifying changes within a space is depicted. Method 200 is described below in conjunction with its performance by server 104, however in other examples, method 200 can be performed by other suitable devices or systems. In method 200 below, server 104 may interact with client device 112, however in other examples, server 104 may interact with data capture device 108, and vice versa. In some examples, some of the blocks of method 200 can be performed in an order other than that illustrated, and hence are referred to as blocks and not steps.

At block 205, server 104 retrieves a previous representation representing space 102. In particular, the previous representation may represent a target portion, such as a particular object or objects, a scene, or other relevant portion within space 102. For example, the previous representation may be a two-dimensional (2D) representation, such as an optical image (i.e., in the visible light spectrum), an infrared image, a thermal image, or the like. In other examples, the previous representation may be a three-dimensional (3D) representation, such as a depth map, a 3D scan, or the like. The previous representation represents the state of space 102 or the target portion of space 102 at a previous instance in time, that is, at the time the previous representation was captured. Server 104 may retrieve the previous representation from the database 120.

Block 205 may be performed in response to a signal from client device 112 (or data capture device 108) to identify differences in space 102 or a target portion of space 102 based on user input at client device 112. In some examples, the user may additionally specify the target portion of space 102, while in other examples, the entirety of space 102 may be selected for analysis.

In some examples, many previous representations of space 102 or the target portion of space 102 may have been captured. Accordingly, server 104 may cooperate with client device 112 to present various previous representations to the user operating client device 112 to select a previous representation to use as a reference to identify changes. For example, after having selected a target portion of space 102, server 104 may identify a set of representations (e.g., images or scans) including the target portion to present at client device 112. The set of representations may include representations of the target portion captured from different points of view and/or representations of the target portion captured at different points in time. Client device 112 may then receive input from the user identifying a particular representation to be used as a reference representation. The selected representation may then be the previous representation retrieved at block 205. In other examples, such as if no particular target portion has been selected, server 104 may not perform the filtering of the representations including the target portion. That is, server 104 may simply identify a set of representations captured at different points in time to be presented at client device 112.

Figure 3:
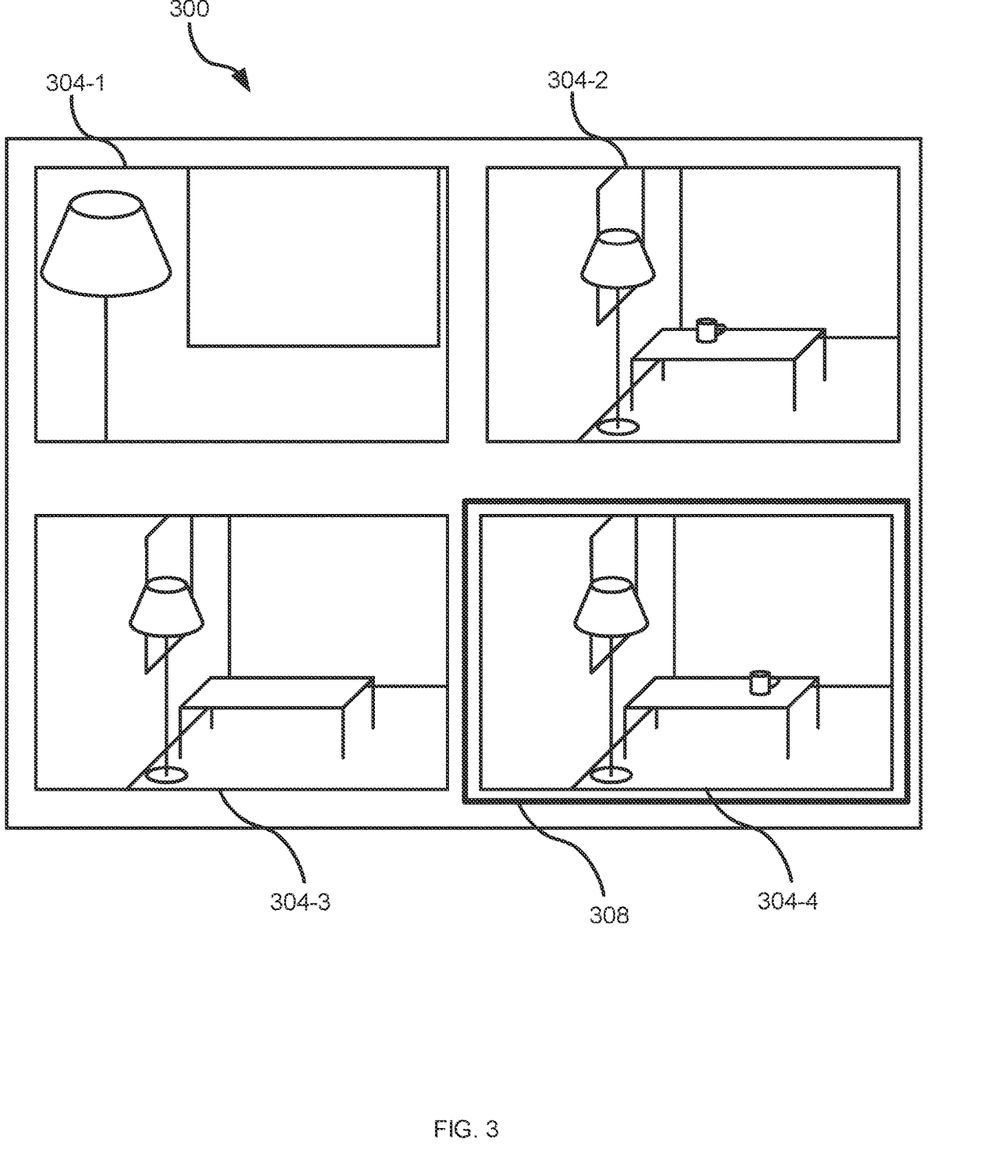
FIG. 3 depicts a schematic diagram of an example view of selection of a previous representation at block 205 of the method of FIG. 2.

For example, referring to FIG. 3, an example presentation 300 of images including a target object (in the present example, a lamp) is depicted. The presentation 300 includes an image 304-1 captured from a first point of view, and images 304-2, 304-3, 304-4 captured from a second point of view, for example with different datetime stamps. The user may make a selection 308 of the image 304-4 as the selected image to use as the previous representation. The selection 308 of image 304-4 can then be transmitted to server 104.

Returning to FIG. 2, at block 210, server 104 obtains a current representation of space 102 or the target portion of space 102. The current representation can represent the target portion or space 102. The current representation may also be a 2D representation, such as an optical image (i.e., in the visible light spectrum), an infrared image, a thermal image, or the like, or the current representation may be a 3D representation, such as a depth map, a 3D scan, or the like. In particular, the format of the current representation may match the format of the previous representation. The current representation preferably represents a current state of space 102 or the target portion of space 102 in real-time, however, in other examples, the current representation may simply represent a state of space 102 or the target portion of space 102 at a later date and/or time than the previous representation. In such examples, the current representation may simply be retrieved from the database 120.

In some examples, block 210 may be performed in response to a selection of a previous representation against which to compare. For example, when the previous representation is a 2D image, to assist with consistency of the point of view of the data capture of the previous representation and the current representation, server 104 may initiate a process to assist with the capture of the current representation. In particular, server 104 may cooperate with data capture device 108 to facilitate obtention of the current representation.

Server 104 may determine the capture point of the selected previous representation, in particular, within context of space 102, and communicate the location of the capture point to data capture device 108. A user may then operate data capture device 108 to localize data capture device 108 in space 102. Data capture device 108 may then render a capture point icon at the capture point of the previous representation based on the location of the capture point received from server 104. For example, the capture point icon may be rendered as an augmented reality component overlaid on the current data capture view of data capture device 108. For example, data capture device 108 may employ methods to render the capture point icon as described in U.S. application Ser. No. 17/345,764, PCT Application No. PCT/IB2021/055172 and PCT Application No. PCT/IB2021/055174, the contents of which are incorporated herein by reference.

Figure 4:
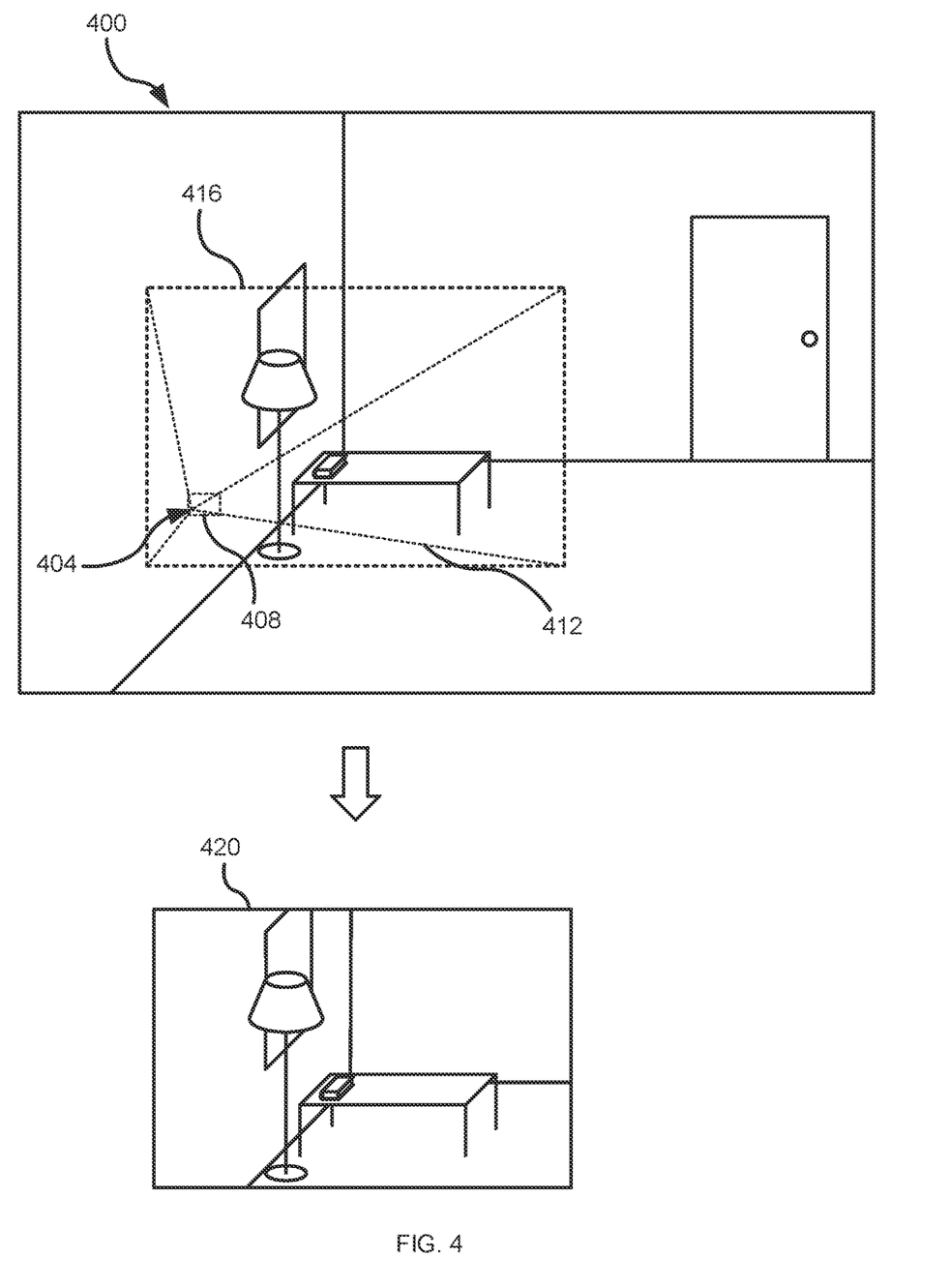
FIG. 4 depicts a schematic diagram of an example view of guidance to obtain a current representation at block 210 of the method of FIG. 2.

Referring to FIG. 4, an example view 400 on data capture device 108 is depicted. The view 400 includes a target capture point 404. Capture point 404 is indicated by a frustum 408 representing the target location of the capture point 404. Capture point 404 can further be indicated by a pyramid 412 extending from frustum 408 and terminating at base 416 representing the plane of the target image to be captured. Frustum 408, pyramid 412 and base 416 may allow the user of data capture device 108 to more easily understand the target image to be captured.

Data capture device 108 may continue to track its location until data capture device 108 detects that it is approximately at the location of the target capture point 404. When data capture device 108 detects that it is at the target location, data capture device 108 may render a guide frame to assist the user with aligning data capture device 108 with the given direction in which data is to captured. The guide frame can be produced using similar tracking techniques used to orient and track the location of data capture device 108 in space 102. The guide frame can be displayed similarly to the capture point icon, as an augmented reality component overlaid on the current data capture view of data capture device 108.

In some examples, when data capture device 108 detects that it is in the correct location in space 102 and oriented in the correct direction, data capture device 108 may trigger an automatic data capture operation to capture a current representation 420. For example, the current representation 420 can be image data (i.e., an image represented by the current data capture view), as presently depicted, or other data, such as thermal imaging data, infrared data, or the like, representing the target portion of space 102. In other examples, the current representation 420 may be captured in response to an input from the user to data capture device 108.

In some examples, when the representation is a 3D representation, data capture device 108 may additionally provide guide features to guide the user to capture data for the updated 3D representation of space 102. That is, data capture device 108 may re-localize itself in space 102 and then present the guide features rendered, for example, as augmented reality components overlaid on the current data capture view, to facilitate appropriate data capture for the updated 3D representation.

Returning to FIG. 2, as will be appreciated, in some examples, block 210 may be performed prior to block 205. For example, after having captured an updated 3D representation or scan of space 102 via data capture device 108, server 104 may prompt the user of data capture device 108 to identify and/or visualize any changes to space 102. Upon receiving an affirmative response from the user via data capture device 108, server 104 may present, via data capture device 108, various previous captures of space 102 to use as the previous representation at block 205.

At block 215, server 104 compares the previous representation retrieved at block 205 with the current representation obtained at block 210. In particular server 104 detects differences in the representations and analyzes the differences to identify changes in space 102 between the time of capture of the previous representation and the time of capture of the current representation.

Figure 5:
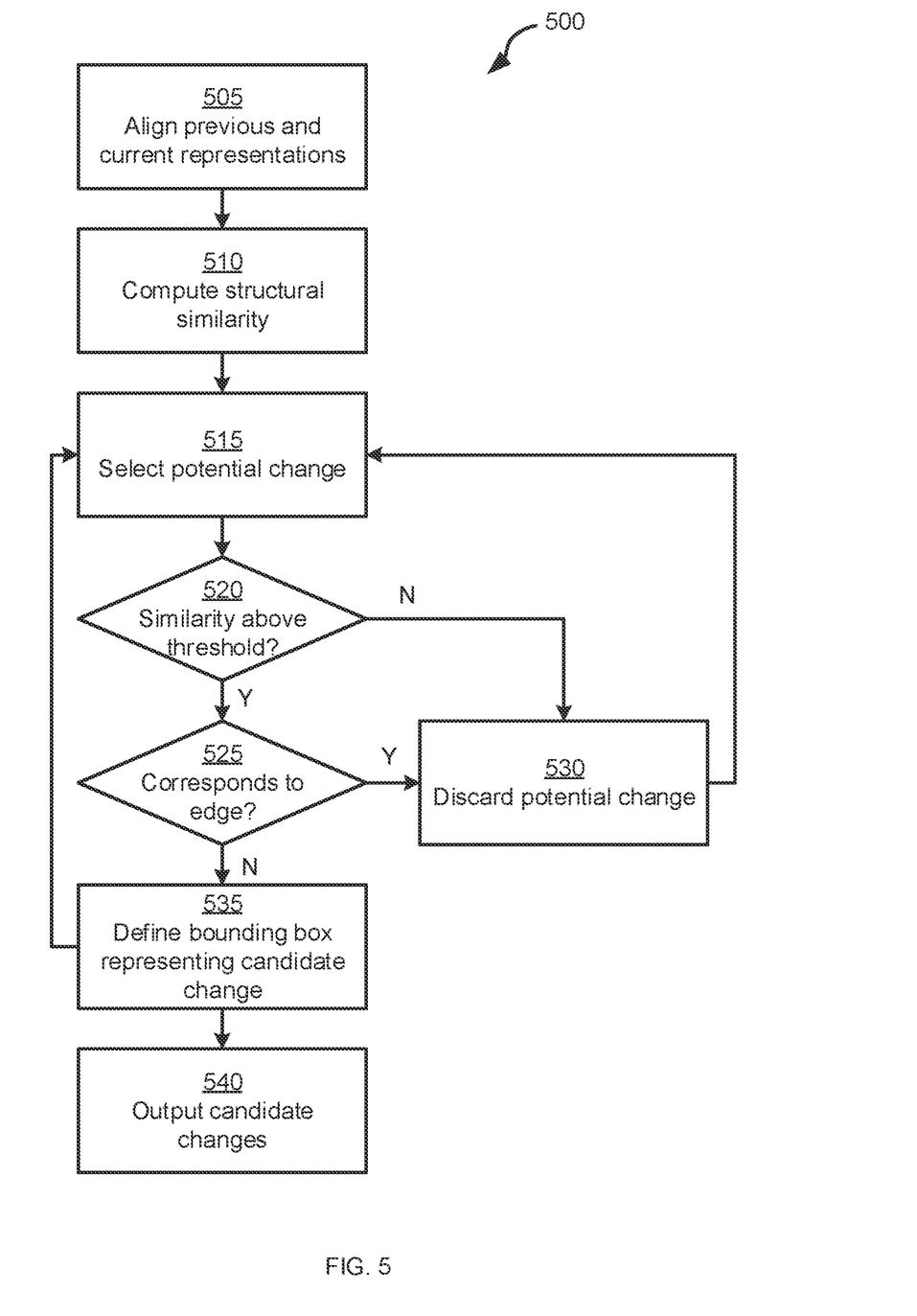
FIG. 5 depicts a flowchart of an example method of identifying candidate changes at block 215 of the method of FIG. 2.

For example, referring to FIG. 5, an example method 500 of determining changes in space 102 is depicted.

At block 505, server 104 aligns the previous representation and the current representation. For example, the 2D images may not be captured perfectly precisely at the same capture point. Accordingly, server 104 may warp the 2D images to be substantially aligned. Warping may include scaling, translations, keystone corrections, homographic transforms, and the like. 3D scans may encompass the entirety of the space 102, and accordingly, corresponding sections of the 3D representation may be extracted from the previous representation and the current representation to be compared, irrespective of the location from which the scan data was captured. Accordingly, to align the previous and current 3D representations, server 104 may simply map the previous and current 3D representations to a common frame of reference (e.g., coordinate system). In some examples, server 104 may verify the alignment of the previous and current representations using an iterative closest point method or the like.

In some examples, server 104 may additionally perform other preprocessing operations at block 505. For example, server 104 may adjust the previous and/or current representations to normalize lighting conditions, contrast, blur, edge sharpness, and the like.

At block 510, server 104 computes the structural similarity between the previous representation and the current representation. Preferably, server 104 may use 2D sensor data to perform the comparison. For example, server 104 may directly compare the 2D previous and current representations. For 3D representations, server 104 may first identify a target portion to compare, extract the RGB (red, green, blue) channel data for the target portion, and compare the extracted RGB-channel data. In some examples, depth data from the 3D representations may additionally be compared. In some examples, server 104 may employ an established image comparator which may compare the representations using a mean-squared error algorithm, a structural similarity index, a Haussdorf distance, a point cloud distance, or the like. The image comparator may output a list of differences identified between the previous representation and the current representation.

As a result, server 104 obtains a list of potential changes, each represented by one of the differences identified between the previous representation and the current representation. Since the differences between the previous representation and the current representation may simply be artefacts based on inconsistencies in the data capture, server 104 may proceed to evaluate each potential change to determine whether it may be classified as a candidate change.

At block 515, server 104 selects one of the potential changes from the list to evaluate further.

At block 520, server 104 determines whether the structural similarity value for the potential change is above a threshold similarity value. In particular, server 104 may compute a similarity value for the potential change based on the similarities of the RGB image data, or other 2D image data. The similarity value represents a similarity between the portions of the image data corresponding to the potential change, and may be computed, for example based on the mean squared error, or other suitable computation. Accordingly, if the similarity value is sufficiently high, server 104 determines the difference between the previous representation and the current representation at the region of the potential change is fairly minor, and hence may not represent an actual change. For example, such differences may be representative of different lighting or shadow conditions, or the like.

The threshold similarity value may be a predetermined value stored at database 120 and may be based, for example, on experimentally determined threshold values.

Accordingly, if the similarity value for the potential change is below the threshold similarity value, server 104 determines that further evaluation is required to evaluate the potential change and proceeds to block 525. If the similarity value for the potential change is above the threshold similarity value, server 104 proceeds to block 530 to discard the potential change.

As will be appreciated, in other examples, other manners of computing the similarity or differences of the potential change are possible and contemplated. For example, rather than computing the similarity between the region of the potential change in the previous representation and the current representation, server 104 may compute a difference value and proceed with an inverse decision.

At block 525, server 104 determines whether the potential change corresponds to an edge in at least one of the previous representation or the current representation. In particular, edges may be difficult to precisely align and provide a distinct contrast, and accordingly, if misaligned, may be likely to be detected as a potential change. Accordingly, server 104 may first run an edge detection algorithm on one or both of the previous representation and the current representation. If server 104 determines that the potential change is within a threshold distance of a detected edge in one or both of the representations, then server 104 may determine that the potential change is unlikely to correspond to an actual change.

As will be appreciated, some additions or deletions of objects within space 102 may cause the addition or deletion of edges, and hence the corresponding potential change identified may indeed correspond with an edge. Accordingly, in order to not filter out such potential changes, in some examples, server 104 may only determine that the potential change corresponds to an edge if the potential change is within a threshold distance of a detected edge in both the previous representation and the current representation. In other examples, server 104 may determine that the potential change corresponds to an edge if the entirety of the potential change is within a threshold distance of a detected edge in either of the previous representation and the current representation. That is, if the potential change itself is edge-like in shape and is within a threshold distance of an edge then the identified potential shape is likely an edge. In contrast, if the potential change forms a larger shape, representative of a surface or similar, portions of the potential change may be outside the threshold distance from a detected edge, and hence the surface represented by the potential change may be preserved.

Accordingly, if server 104 determines that the potential change corresponds to an edge, server 104 proceeds to block 530 to discard the potential change. At block 530, after discarding the potential change, either because the two representations at the region of the potential change were similar, or because the potential change corresponded to an edge in one or both of the two representations, server 104 returns to block 515 to select a new potential change to be evaluated.

If server 104 determines that the potential change does not correspond to an edge, then server 104 may proceed to block 535. At block 535, server 104 validates the potential change as a candidate change. That is, server 104 expects that the potential change selected at block 515 is likely to represent an actual change, and hence as a result, modifies its classification to a candidate change.

At block 535, server 104 may additionally define a bounding box for the candidate change. The bounding box may be defined to encompass the candidate change based on, for example on the upper and lower bounds of the pixel coordinates of the candidate change. In other examples, other shapes or definitions to define a boundary for the candidate change are contemplated. That is, the bounding box need not strictly be a rectangular box.

After performance of block 535, if there are additional potential changes to be evaluated, server 104 returns to block 515 to select another potential change to be evaluated. If all of the potential changes output at block 510 have been evaluated and either discarded or classified as a candidate change, then server 104 may proceed to block 540.

In some examples, prior to proceeding to block 540, server 104 may perform additional processing on the list of candidate changes. For example, referring to FIG. 6, an example method 600 of further filtering and combining the candidate changes is depicted.

Figure 6:
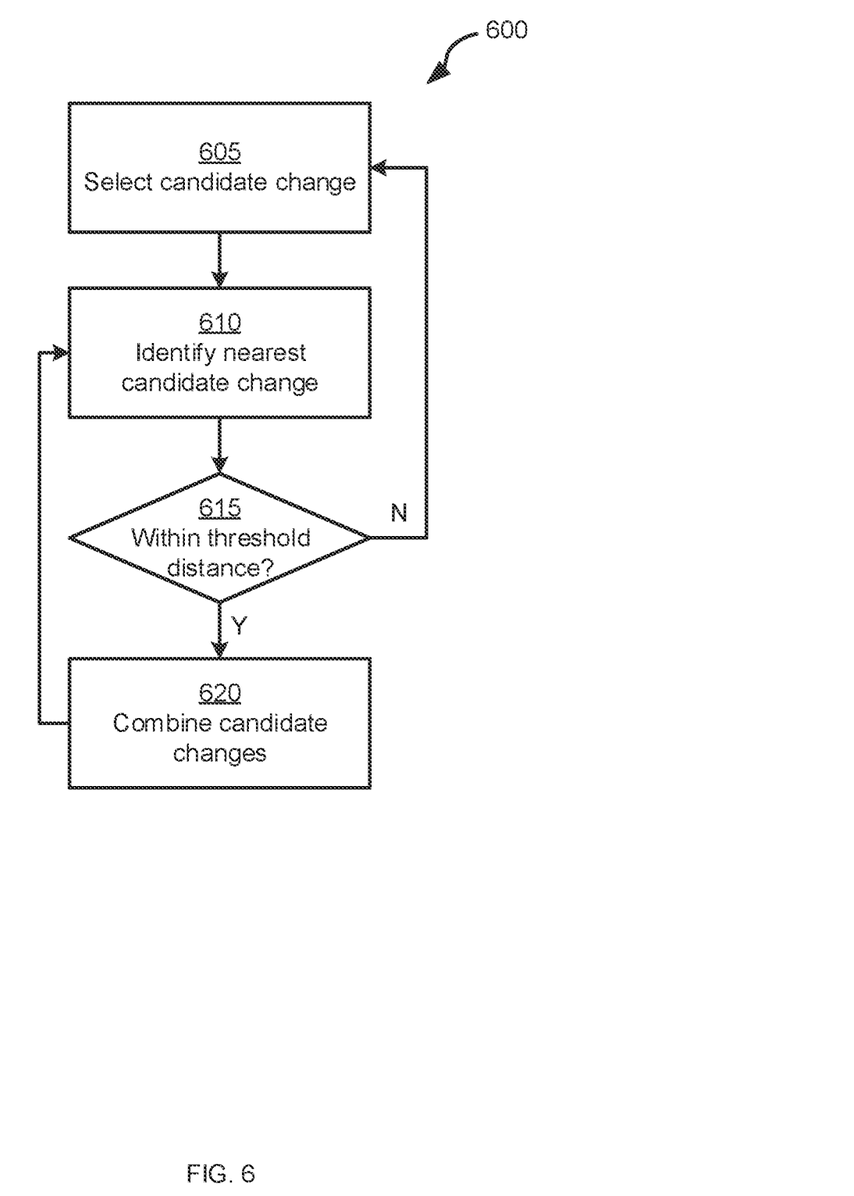
FIG. 6 depicts a flowchart of an example method of combining candidate changes after performance of block 535 of the method of FIG. 5.

At block 605, server 104 selects a candidate change to evaluate for combination with other candidate changes.

At block 610, server 104 identifies the nearest additional candidate change in the list. The nearest additional candidate change may be evaluated based, for example, on the shortest distance between any point of the candidate change selected at block 605 and any point of the additional candidate change. In other examples, the distance between candidate changes may be determine based on an average distance, or other suitable computations.

At block 615, after having identified the nearest additional candidate change to the selected candidate change, server 104 determines whether the nearest additional candidate change is within a threshold distance of the selected candidate change.

In some examples, the threshold distance may be based on an image distance, that is based on the pixel-based distance between the candidate changes. In other examples, the threshold distance may be based on a real-world distance.

That is, server 104 may first determine a scale of the image and use the scale to estimate the distance between the candidate changes.

In particular, if the candidate changes are sufficiently close together, the candidate changes may represent different portions of the same object which was changed in space 102. Accordingly, if, at block 615, server 104 makes an affirmative determination, that is that the selected candidate change is within the threshold distance of the nearest additional candidate change, then server 104 proceeds to block 620.

In some examples, prior to applying the threshold distance, server 104 may first classify the selected candidate change and the nearest additional candidate change as additions or deletions using the depth data, as described in further detail below. If the selected candidate change and the nearest additional candidate change are classified differently (i.e., one is an addition and one is a deletion), server 104 may make an affirmative determination at block 615, irrespective of the relative distance between the candidate changes and the threshold distance.

At block 620, since the candidate changes are within the threshold distance, server 104 determines that the candidate changes are part of the same change and combines them. That is, server 104 may redefine the selected candidate change as including both the original selected candidate change and the nearest additional candidate change. Further, server 104 may redefine the bounding box for the candidate change as encompassing both the selected candidate change and the nearest additional candidate change.

After combining the changes, server 104 returns to block 610 to identify the next nearest candidate change to evaluate whether to combine it as well with the newly combined candidate changes.

If, at block 615, server 104 makes a negative determination, that is the next nearest candidate change is not within the threshold distance to the selected candidate change (or the redefined candidate change), then server 104 returns to block 605 to select another candidate change for evaluation and combination.

Once each of the candidate changes have been evaluated and combined, server 104 may return to method 500. In particular, returning to FIG. 5, at block 540, server 104 outputs the candidate changes. In some examples, server 104 may simply output the candidate changes for further processing within server 104. In other examples, server 104 may output the candidate changes for review and confirmation by a user, for example operating client device 112 or data capture device 108.

Figure 7:
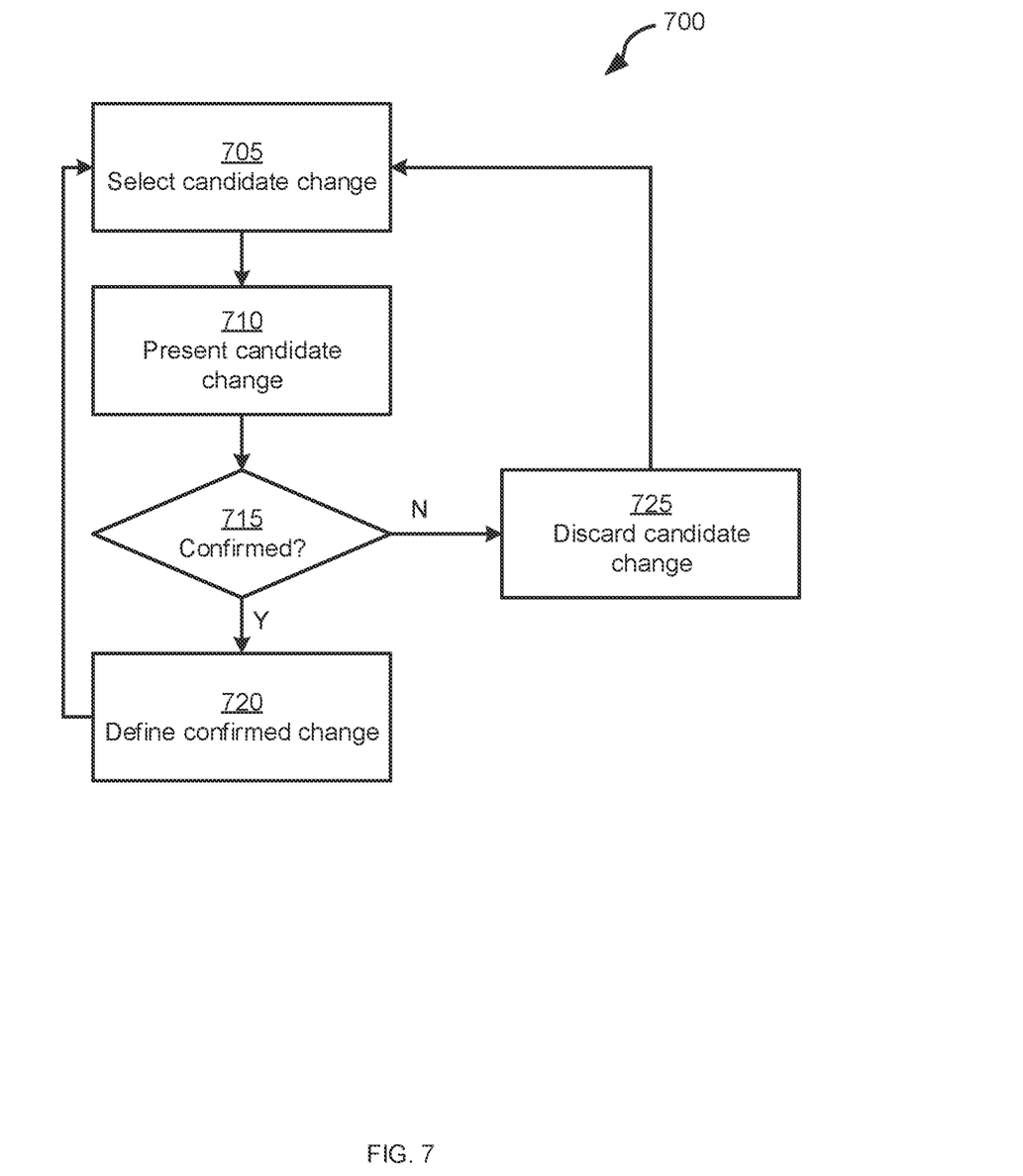
FIG. 7 depicts a flowchart of an example method of confirming candidate changes after performance of block 535 of the method of FIG. 5.

For example, referring to FIG. 7, an example method 700 of confirming candidate changes is depicted. Method 700 is described with reference to its performance by server 104 and client device 112, however in other examples, portions of method 700 may be performed by data capture device 108 rather than client device 112, and/or other suitable devices and/or systems.

At block 705, server 104 selects a candidate change to confirm.

At block 710, server 104 presents the candidate change to the user via client device 112. For example, client device 112 may display the previous representation and the current representation with the candidate change and the bounding box for the candidate change in one or both of the representations.

Figure 8:
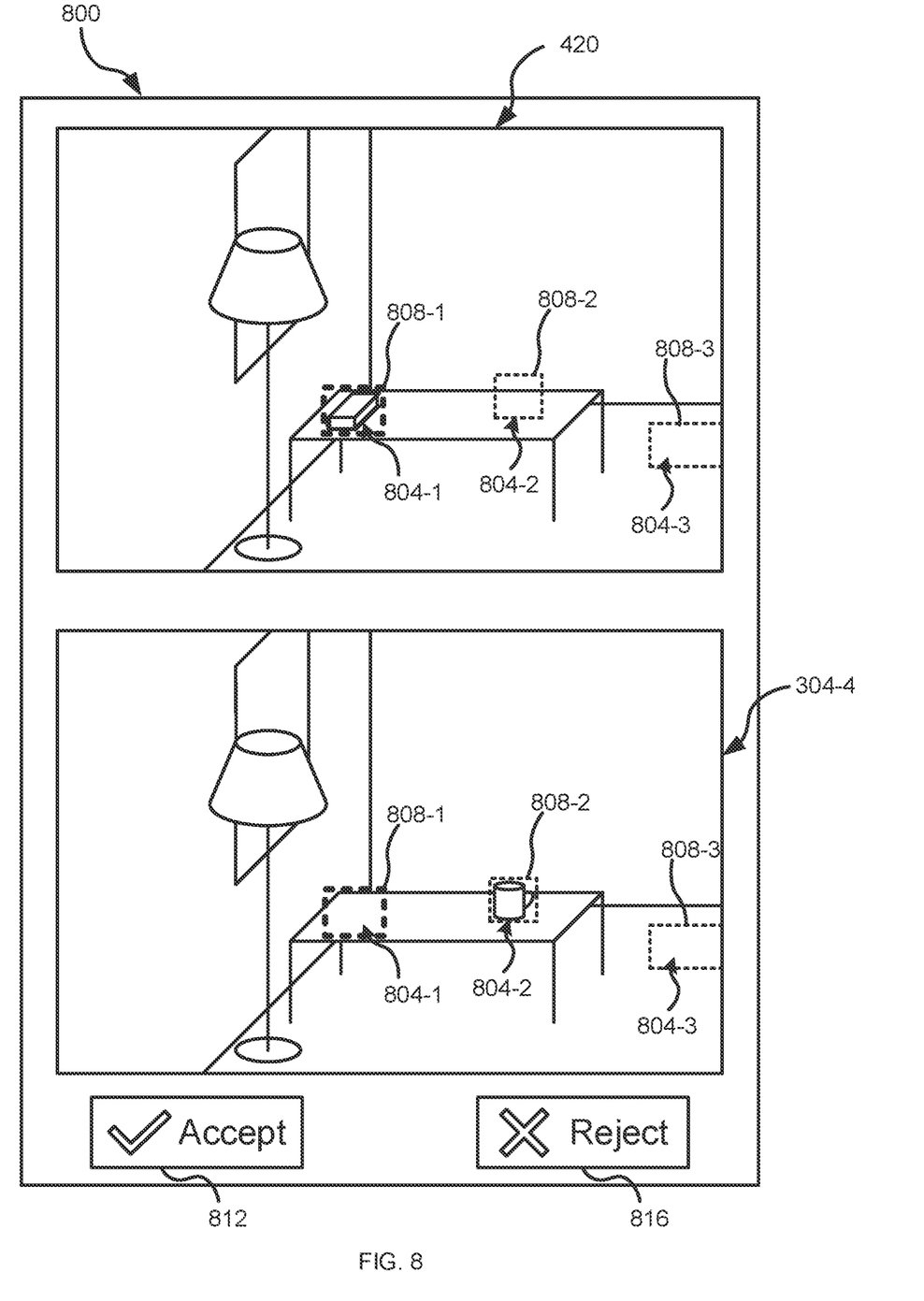
FIG. 8 depicts a schematic diagram of an example view of confirming candidate changes at block 710 of the method of FIG. 7.

FIG. 8 depicts an example view 800 which may be presented at client device 112. View 800 includes a presentation of current representation 420 obtained at block 210 of method 200, and a presentation of previous representation 304-4 selected at block 205 of method 200. Further, as a result of performance of method 500, server 104 may identify three candidate changes 804-1, 804-2, and 804-3. In particular, candidate changes 804 may be represented by their bounding boxes, 808-1, 808-2 and 808-3. As can be seen, the bounding boxes 808 may appear in both current representation 420 as well as previous representation 304-4 to allow the user to easily identify where the change is located with respect to both representations.

The candidate changes 804 may be presented sequentially to the user of client device 112 to confirm or deny. For example, in the present example, bounding box 808-1 is emphasized to confirm or deny candidate change 804-1. Accordingly, view 800 may additionally include an affirmative input option 812 as well as a negative input option 816. The user may select one of the input options 812, 816 via a touch-sensitive display of client device 112, or another suitable input mechanism.

Returning to FIG. 7, at block 715, client device 112 receives an input from the user operating client device 112 and transmits the input to server 104 to confirm or discard the candidate change. If the input received at client device 112 is affirmative, that is, the user wants to confirm the candidate change as an actual change in space 102, then server 104 proceeds to block 720.

At block 720, server 104 confirms the candidate change as a confirmed change. If there are any further candidate changes to evaluate, server 104 returns to block 705 to select another candidate change.

For example, referring again to FIG. 8, server 104 may receive an affirmative input for the candidate change 804-1, since a book is present in current representation 420 that was not present in previous representation 304-4. Server 104 and client device 112 may then return to block 705 to cycle through to emphasize bounding boxes 808-2 and 808-3 to validate candidate changes 804-2 and 804-3. In the present example, server 104 may receive an affirmative input for candidate change 804-2, since a mug was present in previous representation 304-4 that was not present in current representation 420. Server 104 may receive a negative input for candidate change 804-3, since nothing appears to have changed on the patch of floor. That is, candidate change 804-3 may have been a result of artefacts in image processing (e.g., in stitching image data for the 3D scan), inconsistent lighting conditions, or other factors.

If, at block 715, the input received at client device 112 is negative, that is, the user does not want to confirm the candidate change as an actual change in space 102, then server 104 proceeds to block 725. At block 725, server 104 discards the candidate change. If there are any further candidate changes to evaluate, server 104 returns to block 705 to select another candidate change.

Returning to FIG. 2, as will now be understood, at block 215, server 104 compares the previous representation obtained at block 205 with the current representation obtained at block 210 to identify a list of changes in space 102. Preferably, the changes may be confirmed changes validated based on user input, however, in other examples, the changes may be candidate changes validated by server 104 based on various algorithms and processing rules, and in still further examples, the changes may be potential changes identified simply by identifying any differences between the previous representation and the current representation based on 2D image data (e.g., RGB channel data).

In some examples, after determining the changes in space 102, server 104 may additionally classify the changes as additions or deletions based on depth data. For example, referring to FIG. 9, an example method 900 of classifying changes based on depth data is depicted.

Figure 9:
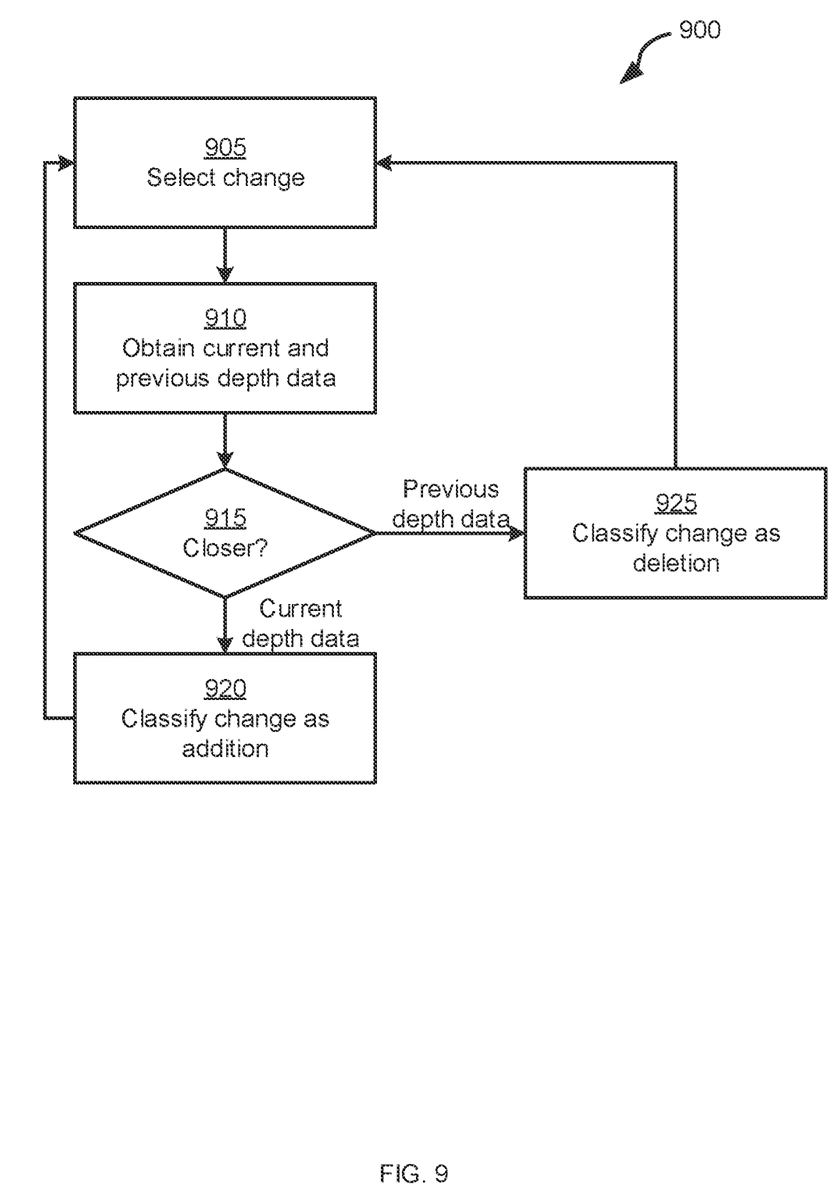
FIG. 9 depicts a flowchart of an example method of classifying changes after performance of block 215 of the method of FIG. 2.

At block 905, server 104 selects a change to classify.

At block 910, server 104 obtains previous depth data associated with the previous representation and current depth data associated with the current representation. For example, the previous and current depth data may be captured simultaneously with and/or as part of the previous and current representations, respectively. In particular, server 104 may extract the depth data associated with the region of the selected change. For example, server 104 may obtain depth data from within the bounding box defining the selected change.

At block 915, server 104 compares the previous depth data and the current depth data in the region of the selected change. In particular, server 104 determines which of the current depth data and the previous depth data is closer in the region of the selected change. For example, server 104 may compare an average depth from the current depth data and the previous depth data. In other examples, server 104 may use another representative depth value (e.g., by sampling or the like) to compare the previous depth data and the current depth data.

If, at block 915, server 104 determines that the current depth data is closer than the previous depth data in the region of the selected change, then server 104 proceeds to block 920. At block 920, server 104 may infer that an object has been moved or placed closer to the point of capture in the current representation, and hence server 104 may classify the change as an addition. For example, change 804-1 of FIG. 8 may be classified as an addition, since the book in current representation 420 produces a closer depth value than the table beneath it in previous representation 304-4.

If, at block 915, server 104 determines that the previous depth data is closer than the current depth data in the region of the selected change, then server 104 proceeds to block 925, server 104 may infer that an object that has been removed in the current representation, so that the background is perceptible behind it, and hence server 104 may classify the change as a deletion. For example, change 804-2 of FIG. 8 may be classified as a deletion, since the mug in previous representation 304-4 produces a closer depth value than the table beneath it in current representation 420.

In some examples, if the current depth data and previous depth data are similar to one another (e.g., within 95% of one another or within one standard deviation of one another, or the like), then rather than proceeding to either block 920 or block 925, server 104 may not classify the change as either an addition or a deletion. In such examples, the server 104 may discard the change (i.e., on the assumption that the identified change is merely an artifact in the representations), or may classify the change as a visual or aesthetic change only (e.g., a television screen now displays different information, but has otherwise not moved or physically changed).

After classification by server 104 at either block 920 or block 925, if there are any additional changes to be classified, server 104 may return to block 905 to select another change to classify.

After classifying the change as an addition or a deletion, server 104 may return to method 200 and proceed to block 220. At block 220, server 104 maps the target portion represented by the previous and current representations to a 3D representation. For example, the 3D representation may be a persistent 3D representation, such as representation 124 stored in database 120. That is, the 3D representation may store and track persistent spatial information over time, allowing changes such as those identified at block 215 to be located within the 3D representation.

At block 225, server 104 stores a change map defining the change or changes identified at block 215 in context of the 3D representation.

For example, the change map can be a layer of annotations associated with the 3D representation identifying the locations of the changes. In particular, bounding boxes defining the changes may form annotations in the change map to emphasize the locations of the changes. The bounding boxes may be mapped to the plane of the 2D image in which the change was identified to contextualize the bounding box in the 3D representation. For example, bounding box 808-1 may be mapped to base 416 defining the image plane of current representation 420.

However, in some examples, such a mapping to the image plane may not accurately locate the change 804-1 in 3D space. Accordingly, in some examples, the bounding boxes may be mapped to the nearest underlying surface in the 3D representation. For example, the bounding box 808-1 may be mapped substantially to the surface of the table.

Figure 10:
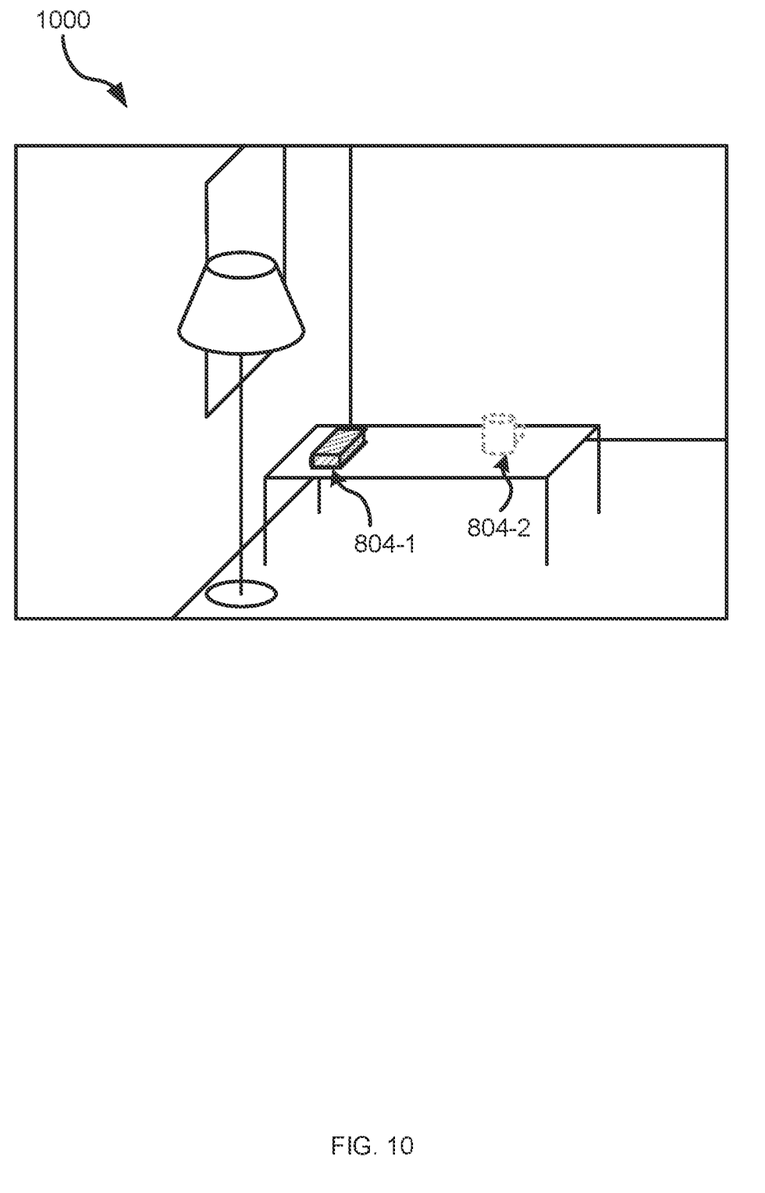
FIG. 10 depicts a schematic diagram of an example view of a change map at block 225 of the method of FIG. 2.

In still further examples, rather than using the bounding boxes as annotations, the change map may use the depth data from the previous and/or current representations to depict the changes classified as additions and deletions. For example, referring to FIG. 10, a change map 1000 is depicted. Server 104 may obtain and employ depth data from current representation 420 to depict additions, such as the change 804-1 for the change map 1000. In some examples, depth data depicting additions may additionally be depicted in a first format, depicted in the present example as having shading. Additionally, server 104 may obtain and employ depth data from previous representation 304-4 to depict deletions, such as the change 804-2 for the change map. Depth data depicting deletions may be depicted in a second format, depicted in the present example as having a dashed, lighter-colored outline.

In some examples, in addition to generating the change map at block 225 of method 200, server 104 may additionally cooperate with client device 112 and/or data capture device 108 to display the change map. For example, the change map may be presented as a navigable 3D representation at client device 112. In another example, the change map may define augmented reality components (i.e., annotations and/or additions and deletions) to display in the current data capture view at data capture device 108 when data capture device 108 is localized in space 102.

Server 104 may additionally store the change map in database 120 for future reference.

As described above, an example system stores persistent 3D spatial data of a space and historical representations of the space to facilitate identifications changes in the space over time. A current representation may be compared to a previous representation to identify the changes. In particular, the system may leverage optical or red-green-blue (RGB) channel data to employ an image comparator to identify potential changes. The system may then further filter and refine the list of potential changes to obtain a list of system-validated candidate changes, or user-validated confirmed changes. In other examples, other types of data (e.g., thermal data, infrared data, etc.) may be compared to identify the potential changes. The system may additionally use depth data associated with the representations to classify the changes as additions or deletions. The changes may be stored in a change map to contextualize the changes within the persistent 3D representation. The change map may also be presented in an interactive format, to facilitate user understanding and visualization of the changes within the space.

The scope of the claims should not be limited by the embodiments set forth in the above examples but should be given the broadest interpretation consistent with the description as a whole.

The invention claimed is:

1. A method comprising:
   retrieving a previous representation representing a target portion of a space;
   obtaining a current representation representing the target portion of the space;
   comparing the previous representation to the current representation to identify a change in the target portion of the space;
   mapping the target portion of the space to a three-dimensional (3D) representation of the space to locate the change within the 3D representation; and
   storing a change map defining the change in context of the 3D representation.

2. The method of claim 1, wherein the previous representation and the current representation comprise images.

3. The method of claim 2, wherein comparing the previous representation and the current representation to identify the change comprises:
   warping the images to align the previous representation and the current representation;
   computing a structural similarity between the previous representation and the current representation to obtain a plurality of potential changes; and
   for each potential change having a structural similarity value below a threshold similarity value, defining the potential change as a candidate change.

4. The method of claim 3, wherein comparing the previous representation and the current representation to identify the change further comprises:
   detecting edges in at least one of the current representation or the previous representation; and
   filtering out the potential changes corresponding to one of the detected edges.

5. The method of claim 3, wherein comparing the previous representation and the current representation to identify the change further comprises:
   combining potential changes within a threshold distance of one another.

6. The method of claim 1, wherein the previous representation and the current representation comprise 3D scans of the space, the 3D scans including image data and depth data.

7. The method of claim 6, wherein comparing the previous representation and the current representation to identify the change comprises:
   mapping the previous representation and the current representation to a common frame of reference; and
   comparing image data from the 3D scans to compute a structural similarity between the previous representation and the current representation to obtain a plurality of potential changes; and
   for each potential change having a structural similarity value below a threshold similarity value, defining the potential change as a candidate change.

8. The method of claim 1, wherein retrieving the previous representation comprises:
   presenting a plurality of previously captured representations of the target portion of the space; and
   selecting one of the previously captured representations as the previous representation based on input from a user.

9. The method of claim 1, further comprising:
   presenting a candidate change for confirmation at a client device; and
   in response to an affirmative input from a user, defining the candidate change as a confirmed change.

10. The method of claim 1, further comprising:
    obtaining previous depth data and current depth data representing the change;
    when the current depth data is closer than the previous depth data, classifying the change as an addition; and
    when the previous depth data is closer than the current depth data, classifying the change as a deletion.

11. The method of claim 10, wherein the change map comprises current depth data depicted in a first format when the change is classified as an addition and previous depth data depicted in a second format when the change is classified as a deletion.

12. The method of claim 1, wherein the change map comprises a layer associated with the 3D representation, the layer including an annotation identifying a location of the change.

13. The method of claim 12, wherein the annotation is mapped to a nearest underlying surface in the 3D representation.

14. The method of claim 1, further comprising displaying the change map at a client device, wherein the change map is presented as one of: a navigable 3D representation and augmented reality components overlaid in a current data capture view.

15. The method of claim 1, wherein the previous representation and the current representation comprise thermal images.

16. A server comprising:
    a memory and a communications interface; and
    a processor interconnected with the memory and the communications interface, the processor configured to:
    retrieve, from the memory, a previous representation representing a target portion of a space;
    receive, via the communications interface, a current representation representing the target portion of the space;
    compare the previous representation to the current representation to identify a change in the target portion of the space;
    map the target portion of the space to a three-dimensional (3D) representation of the space to locate the change within the 3D representation; and
    store a change map defining the change in context of the 3D representation.

17. The server of claim 16, wherein the previous representation and the current representation comprise images, and wherein to compare the previous representation and the current representation, the processor is configured to:
    warp the images to align the previous representation and the current representation;
    compute a structural similarity between the previous representation and the current representation to obtain a plurality of potential changes; and
    for each potential change having a structural similarity value below a threshold similarity value, define the potential change as a candidate change.

18. The server of claim 17, wherein to compare the previous representation and the current representation, the processor is further configured to:

detect edges in at least one of the current representation or the previous representation; and filter out the potential changes corresponding to one of the detected edges.

19. The server of claim 16, wherein the previous representation and the current representation comprise 3D scans of the space, the 3D scans including image data and depth data and wherein to compare the previous representation and the current representation to identify the changes, the processor is configured to:

map the previous representation and the current representation to a common frame of reference; and compare image data from the 3D scans to compute a structural similarity between the previous representation and the current representation to obtain a plurality of potential changes; and for each potential change having a structural similarity value below a threshold similarity value, define the potential change as a candidate change.

20. The server of claim 16, wherein the processor is further configured to:

obtain previous depth data and current depth data representing the change;

when the current depth data is closer than the previous depth data, classify the change as an addition; and when the previous depth data is closer than the current depth data, classify the change as a deletion.

21. A system comprising:

a database storing previously captured representations of a space and a persistent 3D representation of the space;

a data capture device configured to capture a current representation of the space; and a server configured to:

retrieve, from the database, one of the previously captured representations;

receive, from the data capture device, the current representation of the space;

compare the previously captured representation and the current representation to identify a change in the space;

locate the change within the persistent 3D representation; and generate a change map defining the change in context of the persistent 3D representation.

* * * * *